Feb. 26, 1952          F. C. FANTZ          2,586,927
                       BUTTERFLY VALVE
                     Filed Aug. 22, 1945
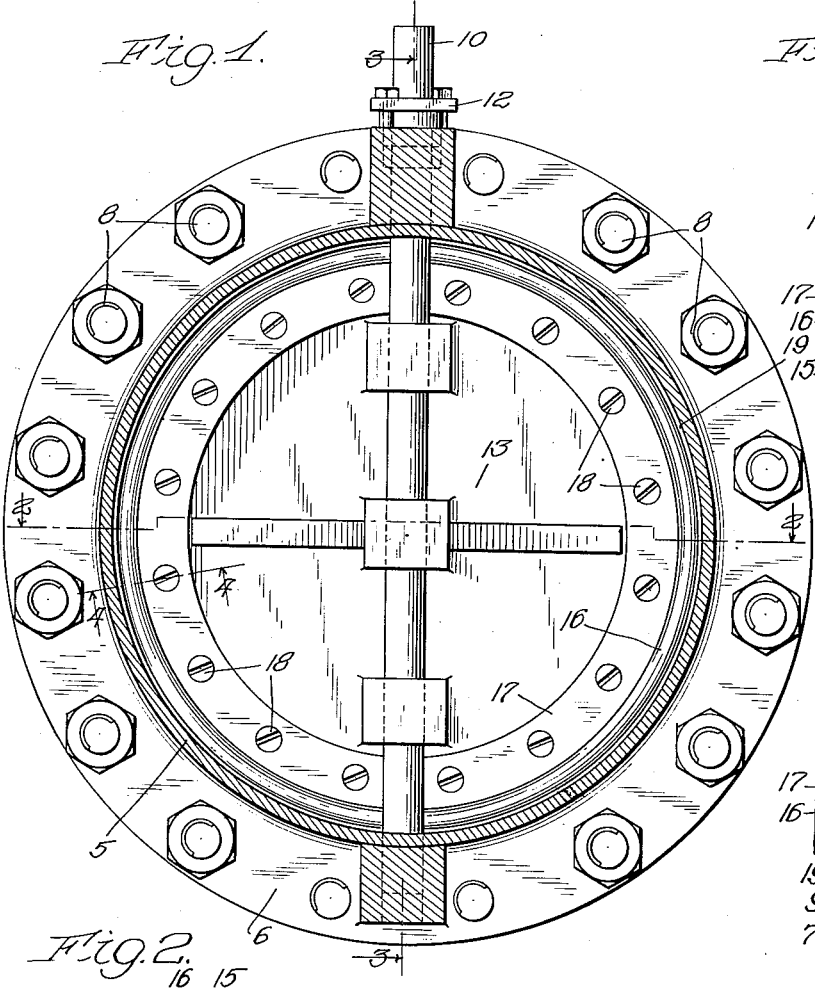
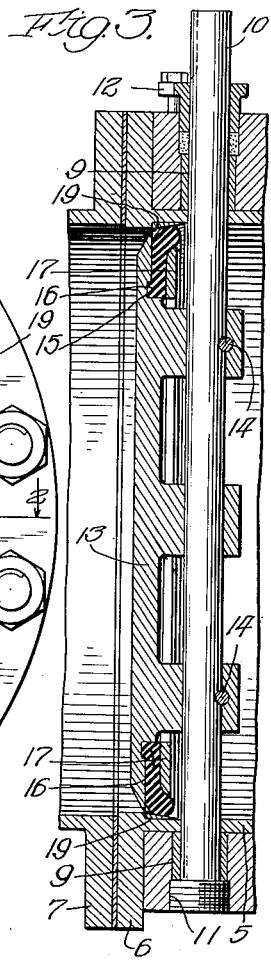
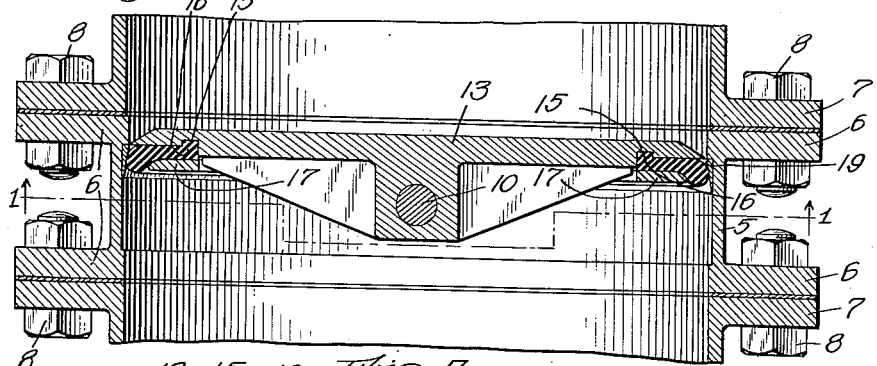
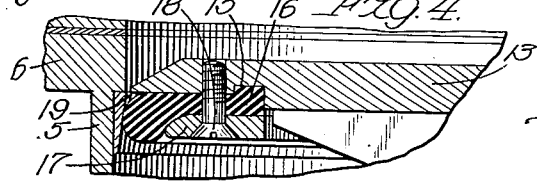
Inventor:
Fred C. Fantz, Patented Feb. 26, 1952

2,586,927

UNITED STATES PATENT OFFICE 2,586,927

BUTTERFLY VALVE

Fred C. Fantz, Logan Township, Auglaize County, Ohio, assignor to Henry Pratt Company, a corporation of Illinois Application August 22, 1945, Serial No. 611,971

3 Claims. (Cl. 251—11)

This invention relates to butterfly valves, and more particularly to large high pressure butterfly valves adapted for use in water mains, and the like.

The primary object of the invention is to provide an improved fabricated steel butterfly valve, which may be inexpensively made of welded parts and easily and quickly operated. It has been found that an 18-inch valve of the improved design will withstand water pressure of one hundred pounds per square inch without leakage.

A further object of the invention is to provide an improved butterfly valve, wherein a rubber-like disk mounted on a shaft centered upstream of the seat will fit tightly on a tapered seat whose face is substantially equidistant from a point at the intersection of the axis of the valve body and the axis of rotation of the shaft.

Another object of the invention is to provide an improved mounting for a rubber gasket.

The invention is illustrated in an improved embodiment in the accompanying drawings, in which—

Figure 1 is a vertical sectional view of the improved valve, taken as indicated at line 1—1 of Fig. 2; Fig. 2, a fragmentary sectional view, taken as indicated at line 2—2 of Fig. 1; Fig. 3, a fragmentary sectional view, taken as indicated at line 3—3 of Fig. 1; and Fig. 4, an enlarged fragmentary sectional view showing how the rubber gasket is attached by means of a shroud ring.

In the embodiment illustrated, a cylindrical body member 5 is provided with welded end flanges 6 of slightly less internal diameter, which may be secured to the flanges 7 of water mains by means of bolts 8. The side walls are shown provided with graphite bronze bearings 9, for a rotary shaft 10 which extends transversely to the cylindrical body. One of the bearings is drilled and tapped, as indicated at 11, for a pipe plug, not shown, and the opposite bearing is provided with a stuffing box 12. The shaft may be provided with suitable levers or gears for oscillating the valve 90°.

A disc-like plate 13 is secured to the shaft 10 by means of taper pins, as indicated at 14. The disc is of slightly less diameter than the cylinder 5, and is positioned in front of the shaft. The disc has a groove 15, to receive a leg 16 of a rubber-like gasket which is clamped to the disc by means of a shroud ring 17, and machine screws 18.

A tapered seat 19 for the gasket is preferably built up with rust-resistant welded metal, such as stainless steel, and is then ground smooth so that its inner face is substantially equidistant from a point at the intersection of the axis of the valve body and the axis of rotation of the shaft 10. It will be understood, however, that as the rubber-like gasket is of yielding material it is not necessary to make the face concave.

Valves of the improved design, being fabricated of steel and having parts secured together by welding, can be made up in a variety of sizes without difficulty.

The foregoing detailed description is given for clearness of understanding only, and no unnecessary limitations should be understood therefrom, for some modifications will be obvious to those skilled in the art.

I claim:

1. A high pressure butterfly valve comprising, a cylindrical body having at one end an inwardly extending annular flange, a transverse rotary shaft diametrically journaled in and extending through said body near but upstream from said flange, a disc-like plate of less diameter than the inner side of said flange secured to said shaft within said body and positioned on said shaft as to lie substantially in the plane of the flange when the valve is in closed position, a tapered annular seat positioned within the cylindrical body with the thicker edge of the seat being located upstream from the thicker edge and of said annular seat abutting said flange and the thinner edge extending around the inner face of said body, a rubber-like annular gasket secured to the marginal edge portion of said plate on the high pressure side to make an increasingly tight connection with said tapered seat as pressure on the gasket is increased, all portions of the tapered face of said annular seat being approximately equidistant from a point at the intersection of the axis of the body and the axis of rotation of the rotary shaft.

2. A high pressure butterfly valve comprising, a cylindrical body provided with an internal annular tapered seat having an inner face facing upstream, a transverse rotary shaft diametrically journaled in and extending through said body near but upstream from said annular seat, a disc-like plate secured to said shaft within said body and positioned on said shaft as to lie substantially in the plane of the seat when the valve is in closed position, the longest diameter of said plate being slightly less than the shortest diameter of said seat, and an annular rubber-like gasket secured to the marginal edge portion of said plate on the high pressure side and extending outwardly beyond said edge to form an annular ring having a diameter larger than the shortest diameter of said seat, said gasket being adapted to contact said seat in sealing relationship when the valve is in closed position and to make an increasingly tight connection with said tapered seat as pressure on the gasket is increased.

3. A device as claimed in claim 2 in which all portions of the tapered face of the annular seat are approximately equidistant from a point at the intersection of the axis of the body and the axis of rotation of the rotary shaft.

FRED C. FANTZ.

REFERENCES CITED

The following references are of record in the file of this patent:

UNITED STATES PATENTS

| Number | Name | Date |
|---|---|---|
| 1,744,798 | Price | Jan. 28, 1930 |
| 2,081,842 | Sharp | May 25, 1937 |
| 2,385,510 | Harwood | Sept. 25, 1945 |

FOREIGN PATENTS

| Number | Country | Date |
|---|---|---|
| 245,650 | Great Britain | of 1926 |
| 302,526 | Great Britain | of 1928 |